(12) United States Patent
Jones et al.

(10) Patent No.: US 7,422,061 B2
(45) Date of Patent: Sep. 9, 2008

(54) FLUID LOSS ADDITIVES AND METHODS

(75) Inventors: Alan L. Jones, Calgary (CA); David P. Horton, Calgary (CA)

(73) Assignee: Calfrac Well Services Ltd., Calgary (CA)

( * ) Notice: Subject to any disclaimer, the term of this patent is extended or adjusted under 35 U.S.C. 154(b) by 296 days.

(21) Appl. No.: 11/164,010

(22) Filed: Nov. 7, 2005

(65) Prior Publication Data

US 2007/0102160 A1    May 10, 2007

(51) Int. Cl.
*E21B 33/13* (2006.01)
*C09K 8/487* (2006.01)

(52) U.S. Cl. .................. 166/293; 106/730; 106/804; 106/808; 106/809

(58) Field of Classification Search ............. 166/293; 106/730, 804, 808, 809
See application file for complete search history.

(56) References Cited

U.S. PATENT DOCUMENTS

| 4,662,943 A | 5/1987 | Baker et al. |
| 5,900,053 A | 5/1999 | Brothers et al. |
| 6,626,992 B2 | 9/2003 | Vijn et al. |
| 6,796,378 B2 * | 9/2004 | Reddy et al. ............... 166/293 |
| 2003/0066460 A1 | 4/2003 | Reddy et al. |
| 2004/0255822 A1 | 12/2004 | Reddy et al. |

FOREIGN PATENT DOCUMENTS

GB    2110699 A    6/1983

OTHER PUBLICATIONS

Natrosol Hydroxyethylcellulose-Physical and Chemical Properties, Hercules, Mar. 1998, 1-22, Aqualon, A Division of Hercules Incorporated.

* cited by examiner

*Primary Examiner*—George Suchfield
(74) *Attorney, Agent, or Firm*—Bennett Jones LLP

(57) ABSTRACT

Nonionic derivatized starch of varying degrees of substitution may be used as a fluid loss additive for well bore cementing operations. A well bore cementing composition may include a cement and a nonionic derivatized starch, the nonionic derivatized starch in a concentration in the cement to provide a fluid loss of less than 200 cc/30 min. A method for cementing subterranean zones penetrated by a well bore may include: providing a cement slurry including mix water, hydraulic cement and a nonionic derivatized starch as an additive for fluid loss control in well cementing applications; pumping the cement slurry into a well; and holding the cement slurry in place until it sets.

8 Claims, No Drawings

FLUID LOSS ADDITIVES AND METHODS

FIELD OF THE INVENTION

This invention relates to compounds that aid in reducing fluid loss of cement slurries used for cementing oil, gas, or water wells and methods of using such compounds.

BACKGROUND OF THE INVENTION

The result of high fluid loss into permeable zones in oil, gas or water wells creates undesirable effects on the cementing job. In well completion operations, a casing (or other form of liner) is suspended in the borehole, and cement is pumped down the casing. The cement flows back up the annulus between the outside of the casing and the wall of the borehole. In this operation, excessive loss of fluid from the cement slurry into permeable zones or formations causes dehydration of the cement slurry resulting in reduced strength and an uncontrollable setting rate. In addition, high fluid loss can result in problems such as the formation of a micro annulus or micro channel allowing the flow of gas and formations fluids outside the casing and poor cement bonding of the tubulars being cemented in place in the well. These problems require expensive remedial squeezes in an effort to correct the problems. In addition to these problems, high fluid losses into permeable production intervals can result in damage of any sensitive formations.

SUMMARY OF THE INVENTION

The present invention relates to the incorporation into the cement slurry of nonionic derivatized starch of varying degrees of substitution as a fluid loss additive.

The present invention relates to a wellbore cementing composition including a cement and a nonionic derivatized starch, the nonionic derivatized starch in a concentration in the cement to provide a fluid loss of less than 200 cc/30 min.

The invention, in another aspect, relates to a method for cementing subterranean zones penetrated by a wellbore including: providing a cement slurry including mix water, hydraulic cement and a nonionic derivatized starch as an additive for fluid loss control in well cementing applications; pumping the cement slurry into a well; and holding the cement slurry in place until it sets.

DETAILED DESCRIPTION OF THE INVENTION

As mentioned above, the use of cement slurries in permeable formation zones has posed possible fluid loss problems, which can prove detrimental to a successful cementing job. Such permeable zones require additives in the cement slurry that will aid in reducing loss of slurry water, fluid loss, to these permeable zones.

Nonionic derivatized starch, such as derivatized hydroxypropyl starch, of varying degrees of substitution can be used as a fluid loss additive. In one aspect the starch may be incorporated in a well bore cementing composition including a cement and the nonionic derivatized starch in a concentration in the cement to provide a fluid loss of less than 200 cc/30 min. In another aspect, the starch may be used in a method for cementing subterranean zones penetrated by a well bore including, providing a cement slurry including mix water, hydraulic cement and with the derivatized hydroxypropyl starch included as an additive for fluid loss control in well cementing applications. The cement slurry may be pumped into a well.

Many nonionic derivatized starches can be stable in sodium chloride and calcium chloride brines, rendering them useful for brine-containing cement slurries. In addition to the salt stability exhibited by these additives, they can also exhibit stability to alkali earth metals as well as some common slurry accelerators and retarders used in the cementing industry. The nonionic derivatized starches can be thermally stable to temperatures of up to 250-300° F. and thermal stability can be enhanced by use of additives for thermal stability, for example, antioxidants such as sodium thiosulfate in a cement slurry mixture.

Optionally, dispersants may be incorporated into the cement slurry with the nonionic derivatized starch polymer. Particular dispersants can enhance the fluid loss performance of the nonionic derivatized starches.

The incorporation of fluid loss additives of the present invention into cement slurries can reduce fluid loss in well cementing operations and can allow for a more efficient bonding between a well liner and the surrounding rock formation of the well.

In one embodiment, nonionic hydroxypropyl starch, for example with a degree of substitution from 0.2 to 1.6, can be used as an additive in cementing compositions to help alleviate some cementing fluid loss problems. The degree of substitution refers to the average number of total substitutents present per glucose unit in the starch. Nonionic hydroxypropyl starch alone or coupled with other additives, for example thermal stabilizers, dispersants and/or those for reducing lost circulation in cement can minimize high fluid losses to the permeable formations and may thus improve cement bonding. Nonionic derivatized starch can be used in an amount effective to provide a fluid loss of less than 200 cc/30 min. Such fluid loss response has been found at low starch concentrations, for example of about 0.1% or more or 0.3% or more by weight of cement (dry weight), in the cement slurry. Although in some instances higher concentrations of starch may be useful, generally a useful upper limit of starch is 1.0% by weight of cement (dry weight).

One nonionic derivatized starch for use as a fluid loss additive can be, for example, hydroxypropylated cornstarch with a degree of substitution of from 0.2 to 1.6 and in one embodiment from 1.0 to 1.4. While hydroxypropylated potato starch and other nonionic hydroxypropylated starches are also effective at minimizing fluid losses, hydroxypropyl cornstarch can, currently, offer a cost benefit over many other starches. It is to be understood that some starches, such as waxy starches for example of maize, may not be appropriate. Waxy starches may generally be defined as those starches including predominantly amylopectin with generally less than about 10% amylose. It is believed that a starch having an amylose content of 15% to 35% and possibly 20% to 30% and possibly 24% to 30% may be the most useful. An inappropriate starch can render a cement slurry too viscous for effective mixing and care should be taken in this regard. Generally, slurries having viscosities above about the following values have been found unsuitable for effective mixing (Fann viscosity): 300 rpm—140, 200 rpm—105, 100 rpm—70, 6 rpm—25 (determined using a Fann™ 35, 6 speed rheometer).

Nonionic hydroxypropyl starch can be combined with cementing dispersants such as, for example, lignosulfonates, substituted sulfonic acids (available, for example, as DAXAD™, Hampshire Chemicals Corp., a subsidiary of The Dow Chemical Company, Midland, Mich.), sodium or potassium salts of a sulfonated naphthalene formaldehyde condensate, polynapthalene sulfonates, sulfonated polyacrylamide, sulfonated styrene/maleic anhydrate copolymers, branched and/or non-branched polycarboxylate (such as Degussa's Liquiment™ K3F and Melflux™ 1641, Degussa Construction Polymers GmbH, Trostberg, Germany) and mixtures thereof. The starch and the dispersant can be combined in a weight percent ratio of, for example, 80:20 to 20:80. Dispersants such as these can facilitate mixing of the starch with cement slurries containing various salts, such as sodium and potassium chloride, various alkali earth metals, and various set retarders such as, but not limited to sodium or calcium lignosulfonate, adipic acid, citric acid, gluconic acid, and tartaric acid, all of which may be found in cement slurries for wellbore cementing operations.

Salts such as sodium, potassium, or calcium chloride can be used in a cement slurry to accelerate set time of the cement and/or for other purposes such as saturation of the slurry for penetration of set times. The salt will often be present in the mix water used to form the slurry. A concentration of salt in water which is sufficient to offer these results can be in one embodiment, for example, 0.05 to 34.0% by weight of water. It is to be understood that the presence of salt in some cement slurries containing starch with low degrees of substitution, for example, less than about 0.5, can render the slurry too viscous for effective mixing and care should be taken in this regard. Starches with a degree of substitution between 0.5 and 1.6 may be useful in such embodiments.

Alkali earth metals such as, for example, one or more of CaO, MgO, $Na_2CO_3$, $Na_2SO_4$, $K_2SO_4$, $CaSO_4$, etc. can be used in a cement slurry to accelerate set time. Generally, a concentration of an alkali earth metal sufficient to cause an accelerated set can be, for example, 0.05 to 3.00% by weight of cement (dry weight).

As will be appreciated, set retarders have been used in cementing slurries. Some set retarders include, but are not limited to, sodium or calcium lignosulfate (for temperatures up to 90° C.), adipic acid, citric acid, gluconic acid, and tartaric acid (for temperatures up to 80° C.).

A cementing composition according to the present invention may include mix water from various sources including natural or treated sources. For example the mix water may include freshwater, unsaturated and saturated salt solutions, etc. Cements useful in well bore cementing operations are generally known as hydraulic cements. As will be appreciated, a useful hydraulic cement may include any one or a combination of various forms including for example, class G cement, Portland, slag, pozzolan, gypsum, aluminous and silica cements. The cementing slurry may include mix water in various concentrations to form a pumpable slurry such as, for example, 35 to 250 cubic meters per tonne of cement.

A cement slurry can be prepared in any manner, for example, by mixing the dry ingredients before addition to the aqueous components or by adding the individual components alone or in various blends to other wetted ingredients already forming a solution or slurry.

The cement slurry may be used to cement a subterranean zones penetrated by a well bore. Various methods can be used including, for example, providing a cement slurry including a derivatized hydroxypropyl starch as an additive for fluid loss control, pumping that cement slurry into the well bore and maintaining the cement slurry in place until the cement sets. The subterranean zones may include at least some permeable zones. The derivatized hydroxypropyl starch may be present in an amount effective to reduce fluid loss, to below about 200 cc/30 minutes.

The cement slurry may include any of various set retarders, set accelerators, dispersants, etc. and may be produced using any of various methods.

EXAMPLES OF THE INVENTION

The following are examples of some cement slurries illustrating their rheological properties and their fluid loss properties in accordance with API Spec 10 (htt://api-ep.api.org). All examples were conducted with class G cement. Some slurries include starch additives at selected degrees of substitution. The selected degrees of substitution range from 1.30 down to 0.39. As is evident from the examples, all of the hydroxypropyl starches provided fluid loss control to some degree. The temperatures of the tests ranged from 40° C. to 80° C. Starches with lower degrees of substitution, can be adversely affected by other slurry components such as potassium, sodium and calcium chloride brines. For example, it was found that the samples for 0.39 degree of substitution were too thick to mix when various salts were added to the mix water. Therefore, no data is presented in the examples for the hydroxypropyl starches with 0.39 degree of substitution and with salt contamination.

Examples I through IV illustrate the various properties of nonionic hydroxypropyl starch with a degree substitution 1.30.

Examples V through X illustrate various properties of nonionic hydroxypropyl starch with a degree of substitution of 0.55.

Examples XI through XIV illustrate the various properties of nonionic hydroxypropyl starch with a degree of substitution of 0.39.

Example XV is a control.

Example I

Using hydroxypropyl cornstarch with a degree of substitution of 1.30.
Concentration of Starch: 7.5 kg per tonne of cement
Concentration of Dispersant: 2.5 kg dispersant (Melflux™ 1641F) per tonne of cement.
Fann viscosity: 300 rpm—53
200 rpm—35
100 rpm—18
2 rpm—2
Fluid Loss (ml/30 minutes)=30 ml.

Example II

Using hydroxypropyl cornstarch with a degree of substitution of 1.30 and 1% calcium chloride.
Concentration of Starch: 7.5 kg per tonne of cement
Concentration of Dispersant: 2.5 kg dispersant (Melflux™ 1641F) per tonne of cement
Fann viscosity: 300 rpm—85
200 rpm—63
100 rpm—35
2 rpm—5
Fluid Loss (ml/30 minutes)=40 ml.

Example III

Using hydroxypropyl cornstarch with a degree of substitution of 1.30 and 18% sodium chloride.
Concentration of Starch: 7.5 kg per tonne of cement
Concentration of Dispersant: 2.5 kg dispersant (Melflux™ 1641 F) per tonne of cement.
Fann viscosity: 300 rpm—80
200 rpm—55
100 rpm—32
2 rpm—7
Fluid Loss (ml/30 minutes)=110 ml.

Example IV

Using hydroxypropyl cornstarch with a degree of substitution of 1.30 and 1.0% of hot lime (CaO).
Concentration of Starch: 7.5 kg per tonne of cement
Concentration of Dispersant: 2.5 kg dispersant (Melflux™ 1641F) per tonne of cement.
Fann viscosity: 300 rpm—65
200 rpm—45
100 rpm—25
2 rpm—2
Fluid Loss (ml/30 minutes)=40 ml.

Example V

Using hydroxypropyl cornstarch with a degree of substitution of 0.55.
Concentration of Starch: 7.0 kg per tonne of cement
Concentration of Dispersant: 5.0 kg dispersant (sulfonated melamine) per tonne of cement.
Fann viscosity: 300 rpm—75
200 rpm—55
100 rpm—30
2 rpm—5
Fluid Loss (ml/30 minutes)=65 ml.

Example VI

Using hydroxypropyl cornstarch with a degree of substitution of 0.55 and 1.0% of hot lime (CaO).
Concentration of Starch: 7.0 kg per tonne of Cement
Concentration of Dispersant: 5.0 kg dispersant (Daxad) per tonne of cement.
Fann viscosity: 300 rpm—95
200 rpm—70
100 rpm—45
2 rpm—10
Fluid Loss (ml/30 minutes)=130 ml.

Example VII

Using hydroxypropyl potato starch with a degree of substitution of 0.55.
Concentration of Starch: 7.0 kg per tonne of cement
Concentration of Dispersant: 2.0 kg dispersant (Melflux™ 1641F) per tonne of cement.
Fann viscosity: 300 rpm—82
200 rpm—60
100 rpm—33
2 rpm—4
Fluid Loss (ml/30 minutes)=30 ml.

Example VIII

Using hydroxypropyl potato starch with a degree of substitution of 0.55 and 1% calcium chloride.
Concentration of Starch: 7.0 kg per tonne of cement
Concentration of Dispersant: 3.0 kg dispersant (Melflux™ 1641F) per tonne of cement.
Fann viscosity: 300 rpm—130
200 rpm—95
100 rpm—55
2 rpm—5
Fluid Loss (ml/30 minutes)=55 ml.

Example IX

Using hydroxypropyl potato starch with a degree of substitution of 0.55 and 18% sodium chloride.
Concentration of Starch: 10.0 kg per tonne of cement
Concentration of Dispersant: 3.0 kg dispersant (Melflux™ 1641F) per tonne of cement.
Fann viscosity: 300 rpm—95
200 rpm—70
100 rpm—40
2 rpm—5
Fluid Loss (ml/30 minutes)=130 ml.

Example X

Using hydroxypropyl potato starch with a degree of substitution of 0.55 and 1% hot lime (CaO).
Concentration of Starch: 7.0 kg per tonne of cement
Concentration of Dispersant: 3.0 kg dispersant (Melflux™ 1641F) per tonne of cement
Fann viscosity: 300 rpm—130
200 rpm—95
100 rpm—55
2 rpm—5
Fluid Loss (ml/30 minutes)=30 ml.

Example XI

Using hydroxypropyl cornstarch with a degree of substitution of 0.39.
Concentration of Starch: 7.0 kg per tonne of Cement
Concentration of Dispersant: None
Fann viscosity: 300 rpm—90
200 rpm—68
100 rpm—40
2 rpm—5
Fluid Loss (ml/30 minutes)=70 ml.

Example XII

Using hydroxypropyl cornstarch with a degree of substitution of 0.39.
Concentration of Starch: 5.0 kg per tonne of cement
Concentration of Dispersant: 5.0 kg dispersant (Daxad™) per tonne of cement.
Fann viscosity: 300 rpm—75
200 rpm—55
100 rpm—30
2 rpm—5
Fluid Loss (ml/30 minutes)=70 ml.

Example XIII

Using hydroxypropyl cornstarch with a degree of substitution of 0.39.
Concentration of Starch: 7.0 kg per tonne of cement
Concentration of Dispersant: 5.0 kg per tonne of dispersant (Daxad™)
Fann viscosity: 300 rpm—85
200 rpm—60
100 rpm—35
2 rpm—5
Fluid Loss (ml/30 minutes)=35 ml.

Example XIV

Using hydroxypropyl cornstarch with a degree of substitution of 0.39.
Concentration of Starch: 7.0 kg per tonne of cement
Concentration of Dispersant: 2.0 kg per tonne of dispersant (Melflux™ 1641F)

Fann viscosity: 300 rpm—85
200 rpm—60
100 rpm—35
2 rpm—5
Fluid Loss (ml/30 minutes)=30 ml.

Example XV

Concentration of Starch: None
Concentration of Dispersant: None
Fann viscosity: 300 rpm—60
200 rpm—46
100 rpm—28
6 rpm—2
Fluid Loss (ml/30 minutes)=800 ml.

The previous description of the disclosed embodiments and examples is provided for the purpose of illustration to enable any person skilled in the art to make or use the present invention and are not intended to be limiting of the scope of the invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. Specifically with respect to the United States, no claim element is to be construed under the provisions of 35 USC 112, sixth paragraph, unless the element is expressly recited using the phrase "means for" or "step for".

What is claimed is:

1. A method for cementing subterranean zones penetrated by a well bore, the method comprising: providing a cement slurry including a derivatized hydroxypropyl starch with a degree of substitution of between 0.2 and 1.6 as an additive for fluid loss control, pumping that cement slurry into the well bore and maintaining the cement slurry in place until the cement sets.

2. The method of claim 1 wherein the subterranean zones include at least some permeable zones.

3. The method of claim 1 wherein the derivatized hydroxypropyl starch is present in an amount effective to reduce fluid loss, to below 200 cc/30 minutes.

4. The method of claim 1 wherein the derivatized hydroxypropyl starch is selected from hydroxypropyl cornstarch or hydroxypropyl potato starch.

5. The method of claim 1 wherein the derivatized hydroxypropyl starch includes a degree of substitution of between 1.0 and 1.4.

6. The method of claim 1 wherein the concentration of derivatized hydroxypropyl starch is 0.3% or more by dry weight of cement.

7. The method of claim 1 wherein providing a cement slurry includes mixing cement and the derivatized hydroxypropyl starch as dry ingredients and then adding mix water.

8. The method of claim 1 wherein providing a cement slurry includes mixing cement and water and then adding the derivatized hydroxypropyl starch.

\* \* \* \* \*